(12) United States Patent
Hori (10) Patent No.: US 12,179,655 B2
(45) Date of Patent: Dec. 31, 2024

(54) VEHICLE LAMP

(71) Applicant: KOITO MANUFACTURING CO., LTD., Tokyo (JP)

(72) Inventor: Takashi Hori, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 230 days.

(21) Appl. No.: 17/793,289

(22) PCT Filed: Dec. 21, 2020

(86) PCT No.: PCT/JP2020/047744
§ 371 (c)(1),
(2) Date: Jul. 15, 2022

(87) PCT Pub. No.: WO2021/145157
PCT Pub. Date: Jul. 22, 2021

(65) Prior Publication Data
US 2022/0402423 A1    Dec. 22, 2022

(30) Foreign Application Priority Data

Jan. 16, 2020    (JP) ................................. 2020-005232

(51) Int. Cl.
*B60Q 1/06*    (2006.01)
*B60Q 1/00*    (2006.01)
(Continued)

(52) U.S. Cl.
CPC ............. *B60Q 1/06* (2013.01); *B60Q 1/0023* (2013.01); *B60S 1/54* (2013.01); *B62J 6/022* (2020.02);
(Continued)

(58) Field of Classification Search
CPC ............... B62J 50/16; B62J 6/022; B60S 1/54
(Continued)

(56) References Cited

U.S. PATENT DOCUMENTS 6,158,671 A    12/2000  Kodaira et al.
2017/0154224 A1*  6/2017  Torii .......................... G06T 3/60
(Continued)

FOREIGN PATENT DOCUMENTS

EP    2 626 243 A1    8/2013
EP    3 453 600 A1    3/2019
(Continued)

OTHER PUBLICATIONS

International Search Report dated Mar. 9, 2021 issued by the International Searching Authority in counterpart International Application No. PCT/JP2020/047744 (PCT/ISA/210).
(Continued)

*Primary Examiner* — Todd Melton
*Assistant Examiner* — Vincent Feng
(74) *Attorney, Agent, or Firm* — Sughrue Mion, PLLC (57) ABSTRACT

A vehicle lamp provided in a vehicle that travels at a corner by tilting a vehicle body includes: a light source unit; a sensor configured to detect information on outside of the vehicle; and a housing that houses the light source unit and the sensor. The vehicle lamp is disposed at a central portion of the vehicle body in a left-right direction, and wherein the sensor is disposed in the housing at a central portion in the left-right direction.

7 Claims, 8 Drawing Sheets

(51) Int. Cl.
  *B60S 1/54*  (2006.01)
  *B62J 6/022*  (2020.01)
  *B62J 50/21*  (2020.01)
  *F21S 45/33*  (2018.01)
  *F21W 107/13*  (2018.01)

(52) U.S. Cl.
  CPC ............... *B62J 50/21* (2020.02); *F21S 45/33* (2018.01); *B60Q 2300/40* (2013.01); *F21W 2107/13* (2018.01)

(58) Field of Classification Search
  USPC .......................................................... 701/49
  See application file for complete search history.

(56) References Cited

U.S. PATENT DOCUMENTS

| | | |
|---|---|---|
| 2019/0283659 A1 | 9/2019 | Moerbe |
| 2021/0070389 A1 | 3/2021 | Harada et al. |
| 2021/0102679 A1* | 4/2021 | Potter ..................... B60Q 1/05 |
| 2021/0114678 A1 | 4/2021 | Harada |

FOREIGN PATENT DOCUMENTS

| | | | | |
|---|---|---|---|---|
| EP | 3 530 556 A1 | 8/2019 | | |
| EP | 3 967 584 A1 | 3/2022 | | |
| JP | 11-157420 A | 6/1999 | | |
| JP | 2013-164913 A | 8/2013 | | |
| JP | 2015123840 A * | 7/2015 | | |
| JP | 2019-48554 A | 3/2019 | | |
| JP | 2019048554 A * | 3/2019 | ............. | B62J 45/41 |
| WO | 2015/174208 A1 | 11/2015 | | |
| WO | 2018/099637 A1 | 6/2018 | | |
| WO | 2018/140402 A1 | 8/2018 | | |
| WO | WO-2018168249 A1 * | 9/2018 | ............. | B60Q 1/12 |
| WO | 2019/039051 A1 | 2/2019 | | |
| WO | 2019/045007 A1 | 3/2019 | | |

OTHER PUBLICATIONS

International Written Opinion dated Mar. 9, 2021 issued by the International Searching Authority in counterpart International Application No. PCT/JP2020/047744 (PCT/ISA/237).

* cited by examiner

VEHICLE LAMP

CROSS-REFERENCE TO RELATED APPLICATIONS

This application is a National Stage of International Application No. PCT/JP2020/047744 filed Dec. 21, 2020, claiming priority based on Japanese Patent Application No. 2020-005232, filed Jan. 16, 2020, the contents of all of which are incorporated herein by reference in their entirety.

TECHNICAL FIELD

The present invention relates to a vehicle lamp.

BACKGROUND ART

Patent Literature 1 discloses a head lamp for a motorcycle provided with a high beam and low beam light source. Patent Literature 2 discloses a configuration in which a camera is disposed in a lamp chamber of a head lamp for a four-wheeled vehicle.

CITATION LIST

Patent Literature

Patent Literature 1: WO2019/039051
Patent Literature 2: JP-A-2013-164913

SUMMARY OF INVENTION

Technical Problem

There is room for improvement in an arrangement configuration in a case where a sensor such as a camera is mounted in a lamp chamber of a head lamp for a motorcycle.

An object of the present invention is to provide a vehicle lamp to be mounted on a motorcycle or the like, in which an efficient layout of a sensor built in the lamp can be made, and detection accuracy of the sensor can be maintained.

Solution to Problem

In order to achieve the above object, a vehicle lamp according to one aspect of the present invention is a vehicle lamp provided in a vehicle that travels at a corner by tilting a vehicle body. The vehicle lamp includes
 a light source unit,
 a sensor configured to detect information on outside of the vehicle, and
 a housing that houses the light source unit and the sensor.
The vehicle lamp is disposed at a central portion of the vehicle body in a left-right direction.
The sensor is disposed in the housing at a central portion in the left-right direction.

Advantageous Effects of Invention

According to the present invention, it is possible to provide a vehicle lamp to be mounted on a motorcycle or the like, in which an efficient layout of a sensor built in the lamp can be made, and detection accuracy of the sensor can be maintained.

DESCRIPTION OF EMBODIMENTS

An embodiment of the present invention will be described with reference to the drawings. In the present embodiment, a "left-right direction", a "front-rear direction", and an "upper-lower direction" are relative directions set for a vehicle (a motorcycle 100) shown in FIG. 1 for the convenience of description.

Figure 1:
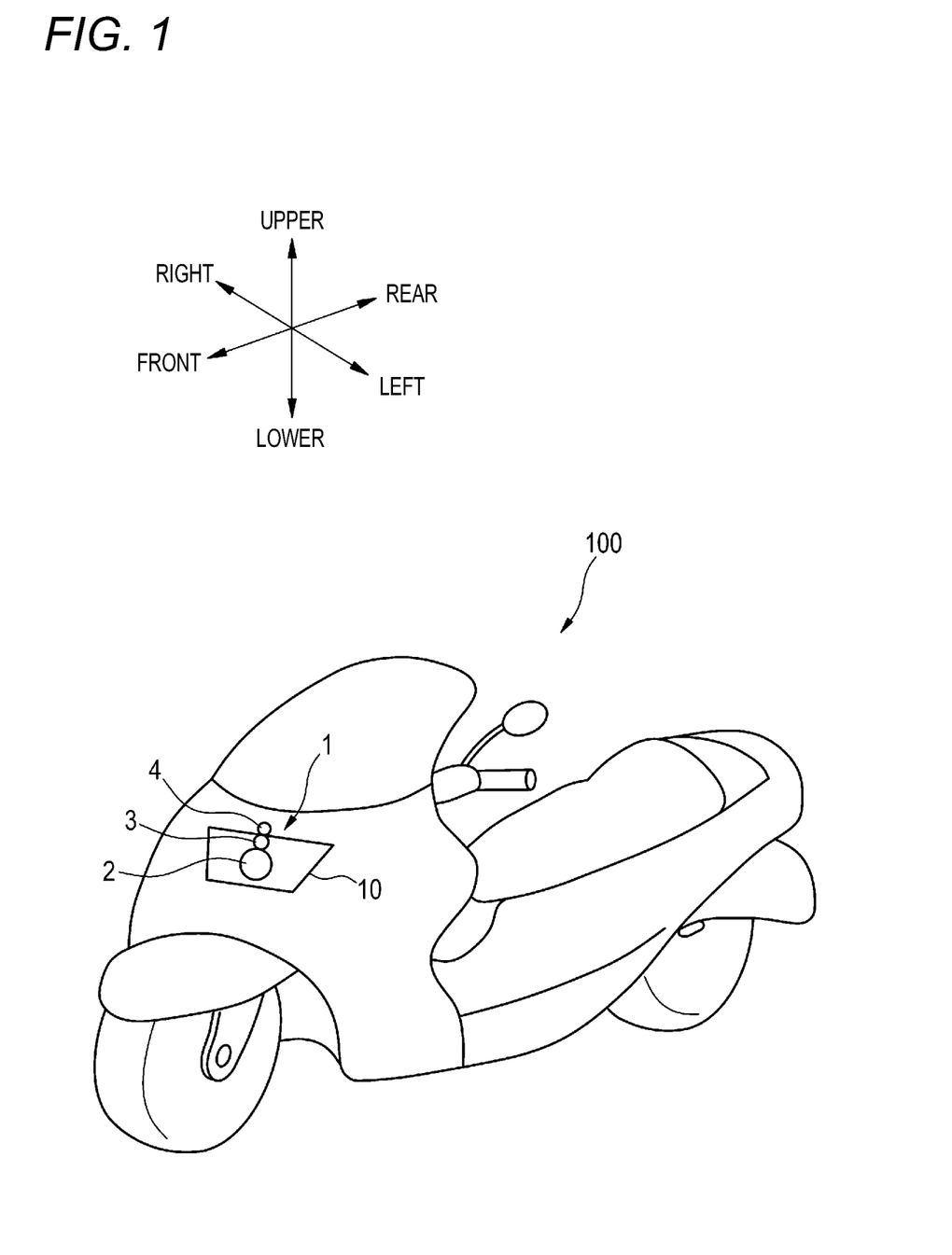
FIG. 1 is a perspective view showing a vehicle including a head lamp (a vehicle lamp) according to an embodiment of the present invention.

FIG. 1 shows the motorcycle 100 as an example of a vehicle according to the present embodiment. The motorcycle 100 is a vehicle that can travel along a corner (curve) of a road by tilting a vehicle body. The number of wheels of the vehicle according to the present embodiment is not limited as long as the vehicle is a vehicle that can travel at a corner by tilting a vehicle body, such as the motorcycle 100. Therefore, for example, a three-wheeled vehicle, a four-wheeled vehicle, or the like are also included in the vehicle according to the present embodiment as long as the vehicle can travel in the same manner as the motorcycle 100.

As shown in FIG. 1, a head lamp 1 (an example of a vehicle lamp) according to the present embodiment is mounted on a front portion of the motorcycle 100. The head lamp 1 is a lamp that can illuminate a front side of the vehicle, and is disposed at a central portion of the vehicle body in the left-right direction. The "central portion of the vehicle body in the left-right direction" is not limited to the fact that a center line of the head lamp 1 is positioned exactly on a center line of the vehicle body of the motorcycle 100, and the center line of the head lamp 1 may be offset from the center line of the vehicle body by about 30% of a vehicle body width.

The head lamp 1 includes a light source unit 2, an external sensor 3, a cleaner 4, and a housing 10.

Figure 2:
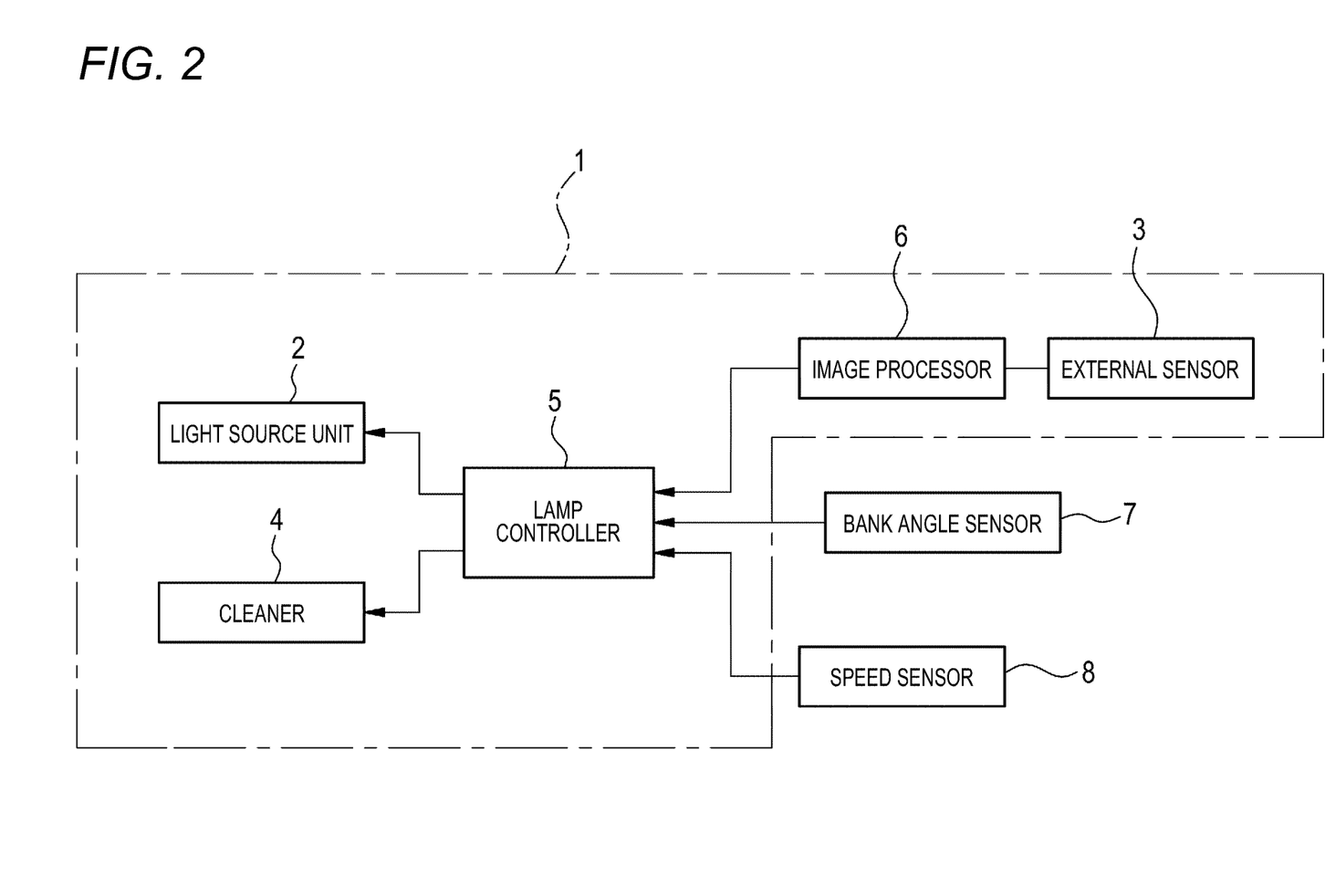
FIG. 2 is a block diagram showing the head lamp shown in FIG. 1.

FIG. 2 is a block diagram showing the head lamp 1. As shown in FIG. 2, the head lamp 1 includes a lamp controller 5 that controls operations of the light source unit 2, the external sensor 3, and the cleaner 4. The light source unit 2, the external sensor 3, and the cleaner 4 are connected to the lamp controller 5. The external sensor 3 is connected to the lamp controller 5 via an image processor 6. In addition, a bank angle sensor 7 that detects a tilting state of the motorcycle 100, a speed sensor 8 that detects a speed of the motorcycle 100, and the like are connected to the lamp controller 5.

The light source unit 2 can radiate a predetermined light distribution pattern toward the front side that is a traveling direction of the motorcycle 100. The light source unit 2 is configured to emit, for example, a low beam light distribution pattern and a high beam light distribution pattern. A detailed configuration of the light source unit 2 will be described later with reference to FIGS. 3 to 6.

The external sensor 3 is a sensor capable of acquiring information on a surrounding environment of the motorcycle 100, for example, information on the outside of the host vehicle including an obstacle, another vehicle (a preceding vehicle, an oncoming vehicle), a pedestrian, a road shape, a traffic sign, and the like. The external sensor 3 includes, for example, at least one of a camera, Light Detection and Ranging or Laser Imaging Detection and Ranging (LiDAR), a radar, and the like.

The camera is, for example, a camera including an imaging element such as a charge-coupled device (CCD) or a complementary MOS (CMOS). The camera is a camera that detects visible light or an infrared camera that detects infrared light. In general, the LiDAR is a sensor that emits invisible light to a front side of the LiDAR and acquires information such as a distance to an object, a shape of the object, and a material of the object based on emitted light and returned light. The radar is a millimeter-wave radar, a microwave radar, a laser radar, and the like.

The image processor 6 connected to the external sensor 3 analyzes data acquired by the external sensor 3, and determines, for example, whether there is an oncoming vehicle or the like whose head lamp is turned on. The image processor 6 corrects, for example, an image acquired by the external sensor 3 to a predetermined image in accordance with information of the bank angle sensor 7. Although the image processor 6 is configured to be independent of the lamp controller 5 in the present embodiment, for example, the image processor 6 may be provided in the lamp controller 5. Alternatively, the image processor 6 may be provided in the external sensor 3.

The cleaner 4 is configured to eject a cleaning medium such as air or a cleaning liquid toward an object. The cleaner 4 can clean the housing 10 of the head lamp 1 by ejecting the cleaning medium. The cleaner 4 can clean at least a region corresponding to the external sensor 3 in the housing 10. A detailed configuration of the cleaner 4 will be described later with reference to FIGS. 3 and 7.

The bank angle sensor 7 is a sensor capable of detecting a tilting angle when the vehicle body of the motorcycle 100 is tilted to the left and right relative to a vertical line. The bank angle sensor 7 is implemented by, for example, a gyro sensor. The tilting angle of the vehicle body may be calculated based on an image captured by a camera such as the external sensor 3.

Information detected by the external sensor 3, the bank angle sensor 7, and the speed sensor 8 is transmitted to the lamp controller 5. The lamp controller 5 controls operations of the light source unit 2 and the cleaner 4 based on the information transmitted from the external sensor 3, the bank angle sensor 7, and the speed sensor 8. For example, the lamp controller 5 can control the light source unit 2 based on information detected by each sensor to adjust a light distribution pattern (a low beam light distribution pattern and a high beam light distribution pattern) formed in front of the vehicle. In addition, the lamp controller 5 can control the cleaner 4 based on information detected by each sensor to clean a front surface of the head lamp 1 by ejecting the cleaning medium.

Figure 3:
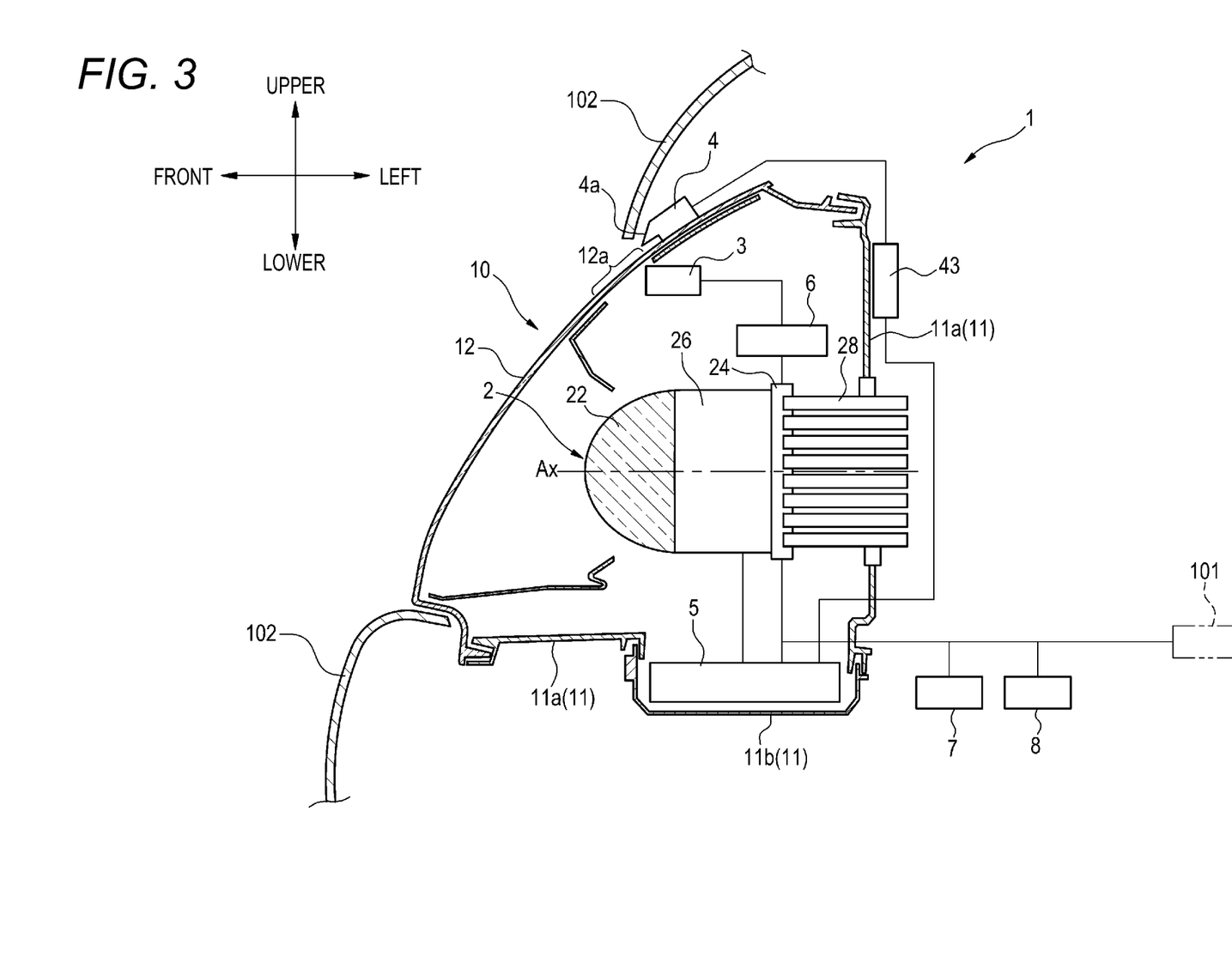
FIG. 3 is a cross sectional view showing a configuration of the head lamp.

FIG. 3 is a vertical cross sectional view showing a configuration of the head lamp 1. As shown in FIG. 3, the head lamp 1 is mounted on, for example, a front cowl 102 of the motorcycle 100. The head lamp 1 includes the housing 10 formed by a lamp body 11 and a transmissive cover 12. The light source unit 2, the external sensor 3, the lamp controller 5, the image processor 6, and the like are housed in the housing 10. The cleaner 4 is attached to the outside of the housing 10.

The lamp body 11 is a box-shaped housing member having an opening at a vehicle front side. The transmissive cover 12 is a transparent cover attached in a manner of covering the opening of the lamp body 11. The lamp body 11 includes a body portion 11a having the opening, and a body attachment and detachment portion 11b detachably attached to a lower portion of the body portion 11a.

The light source unit 2 is disposed in the housing 10 at a substantially central portion in the upper-lower direction. The light source unit 2 includes a projection lens 22, a light emitting unit 24 on which a light emitting element is mounted, and a holder 26 that holds the projection lens 22 and the light emitting unit 24. A heat sink 28 is attached to the light emitting unit 24. The projection lens 22 is disposed on an optical axis Ax extending in the vehicle front-rear direction. The projection lens 22 is held on a front end side of the holder 26. The light emitting unit 24 is held on a rear end side of the holder 26. The light emitting unit 24 is electrically connected to the lamp controller 5. The holder 26 is attached to the lamp body 11 via a support member (not shown).

The external sensor 3 is disposed in the housing 10 at an upper portion in the upper-lower direction. That is, the external sensor 3 is disposed above the light source unit 2 in the housing 10. The external sensor 3 is attached in a manner of facing a front side that is a traveling direction of the motorcycle 100. For example, the external sensor 3 is attached in a direction along the optical axis Ax of the light source unit 2 extending in the front-rear direction.

The lamp controller 5 is housed in the body attachment and detachment portion 11b of the lamp body 11. The lamp controller 5 is configured to be removed from the housing 10 and taken out to the outside by removing the body attachment and detachment portion 11b from the body portion 11a in a state in which the transmissive cover 12 is assembled to the body portion 11a. The lamp controller 5 is connected to the light source unit 2, the external sensor 3, the cleaner 4, the bank angle sensor 7, and the speed sensor 8, and is also connected to a vehicle controller 101 that controls traveling of the motorcycle 100.

The cleaner 4 is disposed above the external sensor 3 in the upper-lower direction of the housing 10. Specifically, the cleaner 4 is disposed outside the housing 10 between an upper portion of the transmissive cover 12 and the front cowl 102. As a result, the cleaner 4 is hidden by the front cowl 102, which is a design component of the motorcycle 100, so that the motorcycle 100 has a good appearance. The cleaner 4 is configured to eject a cleaning medium toward a region (a cleaning target surface) corresponding to the external sensor 3 on the transmissive cover 12. For example, the cleaner 4 can clean at least a sensor region 12a of the transmissive cover 12 that covers a front region of the external sensor 3.

The cleaner 4 is implemented by, for example, an air blower capable of preventing foreign matters from adhering to an object to be cleaned. The air blower is a device that achieves an air curtain function of preventing foreign matters from adhering to the transmissive cover 12 by continuously blowing air at a predetermined wind speed or a predetermined air volume to an object to be cleaned such as the transmissive cover 12 so that a constant air always flows on a surface layer of the transmissive cover 12. The cleaner 4 has at least one nozzle 4a capable of sending air toward the transmissive cover 12. The cleaner 4 is connected to the lamp controller 5 via a motor 43 which is a driving source of the cleaner 4. The cleaner 4 can, for example, prevent foreign matters from adhering to the sensor region 12a of the transmissive cover 12. In the motorcycle 100, since it is difficult to mount a cleaning liquid tank on a vehicle body, it is desirable to adopt an air blower or the like using air as a cleaning medium as a cleaning mechanism. However, when a cleaning liquid tank can be mounted on the vehicle body, a cleaner using a cleaning liquid as a cleaning medium may be adopted.

Figure 4:
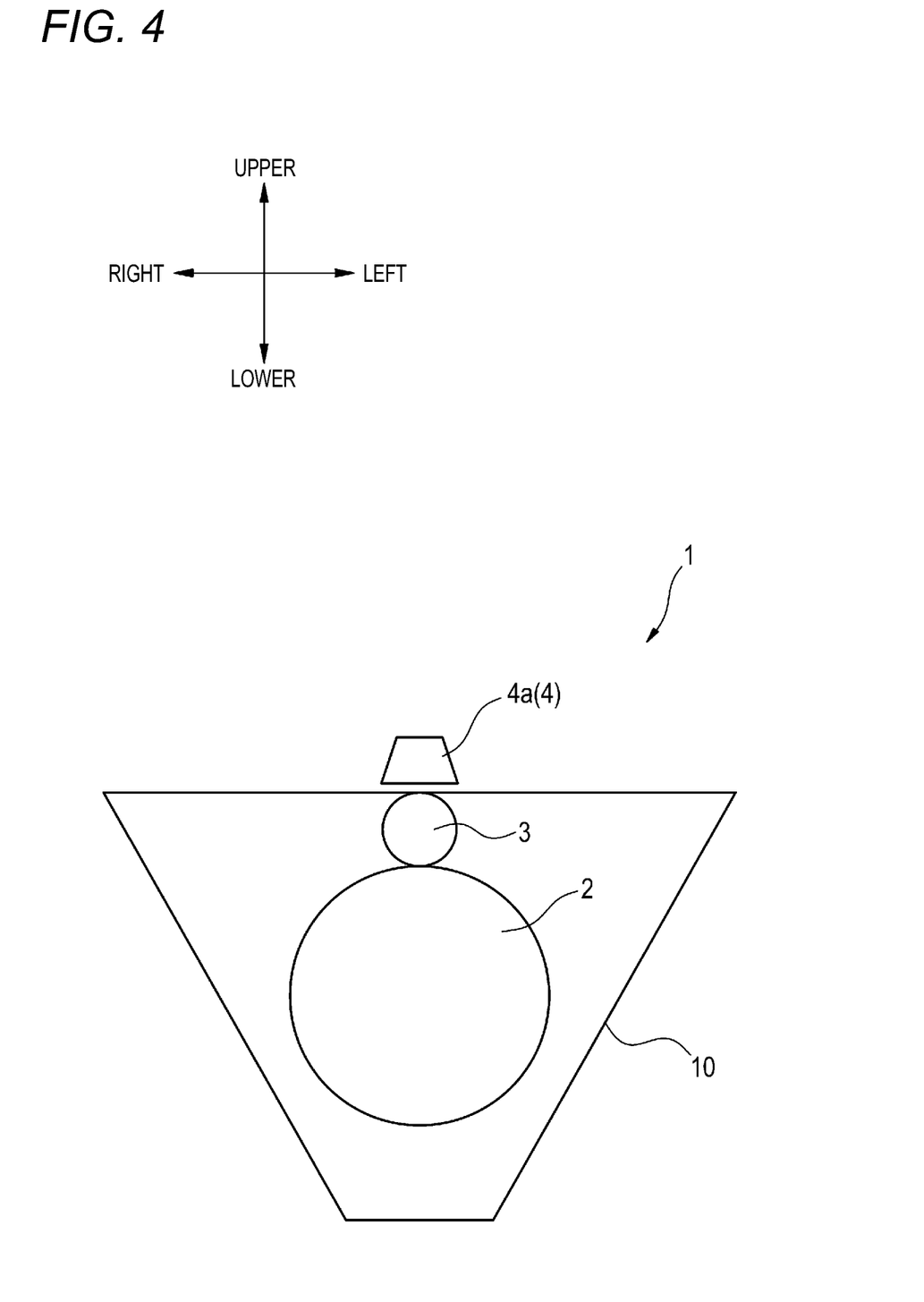
FIG. 4 is a front view schematically showing the configuration of the head lamp.

FIG. 4 is a front view schematically showing the configuration of the head lamp 1. As shown in FIG. 4, the light source unit 2 is disposed in the housing 10 at a central portion of the head lamp 1 in the left-right direction. The external sensor 3 is disposed in the housing 10 at a central portion of the head lamp 1 in the left-right direction. That is, the external sensor 3 is disposed in parallel with the light source unit 2 in the upper-lower direction of the head lamp 1. In the present example, the external sensor 3 is disposed directly above the single light source unit 2. The nozzle 4a of the cleaner 4 is disposed outside the housing 10 at a central portion of the head lamp 1 in the left-right direction. That is, the cleaner 4 is disposed in parallel with the external sensor 3 in the upper-lower direction of the head lamp 1. In the present example, the cleaner 4 is disposed directly above the external sensor 3.

Figure 5:
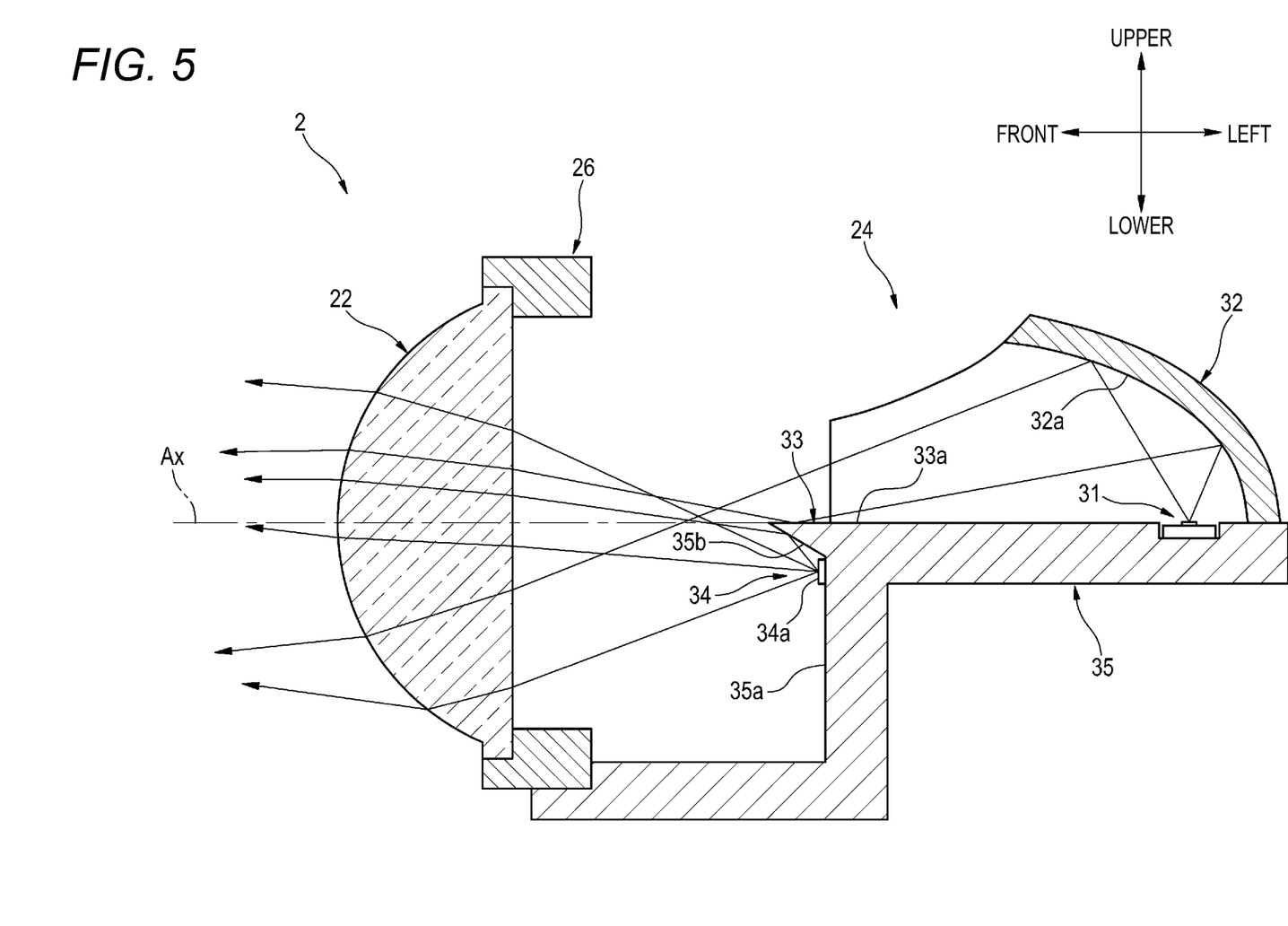
FIG. 5 is a cross sectional view showing a configuration of a light source unit provided in the head lamp.

FIG. 5 is a cross sectional view showing an example of the light source unit 2. As shown in FIG. 5, the light source unit 2 is implemented as a projector-type unit. The light source unit 2 includes the projection lens 22 having an optical axis Ax extending in the vehicle front-rear direction, and the light emitting unit 24 provided at a rear side of the projection lens 22.

The light emitting unit 24 includes a light emitting element 31 that serves as a light source and is disposed at a rear side of a rear focus point F of the projection lens 22, and a reflector 32 that is disposed in a manner of covering the light emitting element 31 from an upper side and reflects light from the light emitting element 31 toward the projection lens 22. The light emitting unit 24 includes a shade 33 that shields a part of the light emitted from the light emitting element 31 toward the projection lens 22 in order to form a low beam light distribution pattern. Furthermore, the light emitting unit 24 includes a plurality of light emitting elements 34 that cause light to be incident on the projection lens 22 in order to additionally form a high beam light distribution pattern to be added to the low beam light distribution pattern.

The projection lens 22 is a plano-convex aspherical lens having a convex front surface and a flat rear surface, and is configured to project a light source image formed on a rear focal plane that is a focal plane including the rear focus point F onto a virtual vertical screen in front of the lamp as an inverted image. The projection lens 22 is supported by the holder 26 at an outer peripheral flange portion of the projection lens 22.

The light emitting element 31 is, for example, a white light emitting diode, is disposed upward in a state in which a light emitting surface of the light emitting element 31 is positioned on a horizontal plane including the optical axis Ax, and is supported by a base member 35. The light emitting surface of the light emitting element 31 is not limited to being disposed upward on the horizontal plane, and may be disposed in a manner of being tilted relative to the horizontal plane. The reflector 32 is also supported by the base member 35. The base member 35 is supported by the holder 26.

The shade 33 has an upward reflecting surface 33a that shields a part of light that is emitted from the light emitting element 31 and is reflected by the reflector 32 and reflects the shielded light upward. The shade 33 causes the light reflected by the upward reflecting surface 33a to be incident on the projection lens 22 and causes the light to be emitted from the projection lens 22 as downward light. The shade 33 is formed integrally with the base member 35. The reflecting surface 33a is formed by applying a mirror surface treatment such as aluminum vapor deposition to an upper surface of the base member 35.

The plurality of light emitting elements 34 are arranged in parallel in the left-right direction below the rear focus point F of the projection lens 22, and are individually turned on by the lamp controller 5. In the present example, although not shown, for example, eleven light emitting elements 34 are arranged at equal intervals in the left-right direction with a position directly below the optical axis Ax as a center. Each of the light emitting elements 34 is a white light emitting diode, and has a light emitting surface 34a having a vertically long rectangular shape. The light emitting elements 34 are supported by a front wall surface 35a of the base member 35 in a state in which the light emitting surface 34a faces a front direction of the lamp. A reflecting surface 35b is formed at an upper end portion of the front wall surface 35a of the base member 35 and serves as a tilting surface that reflects a part of emitted light from the light emitting elements 34 toward a front side.

Figure 6:
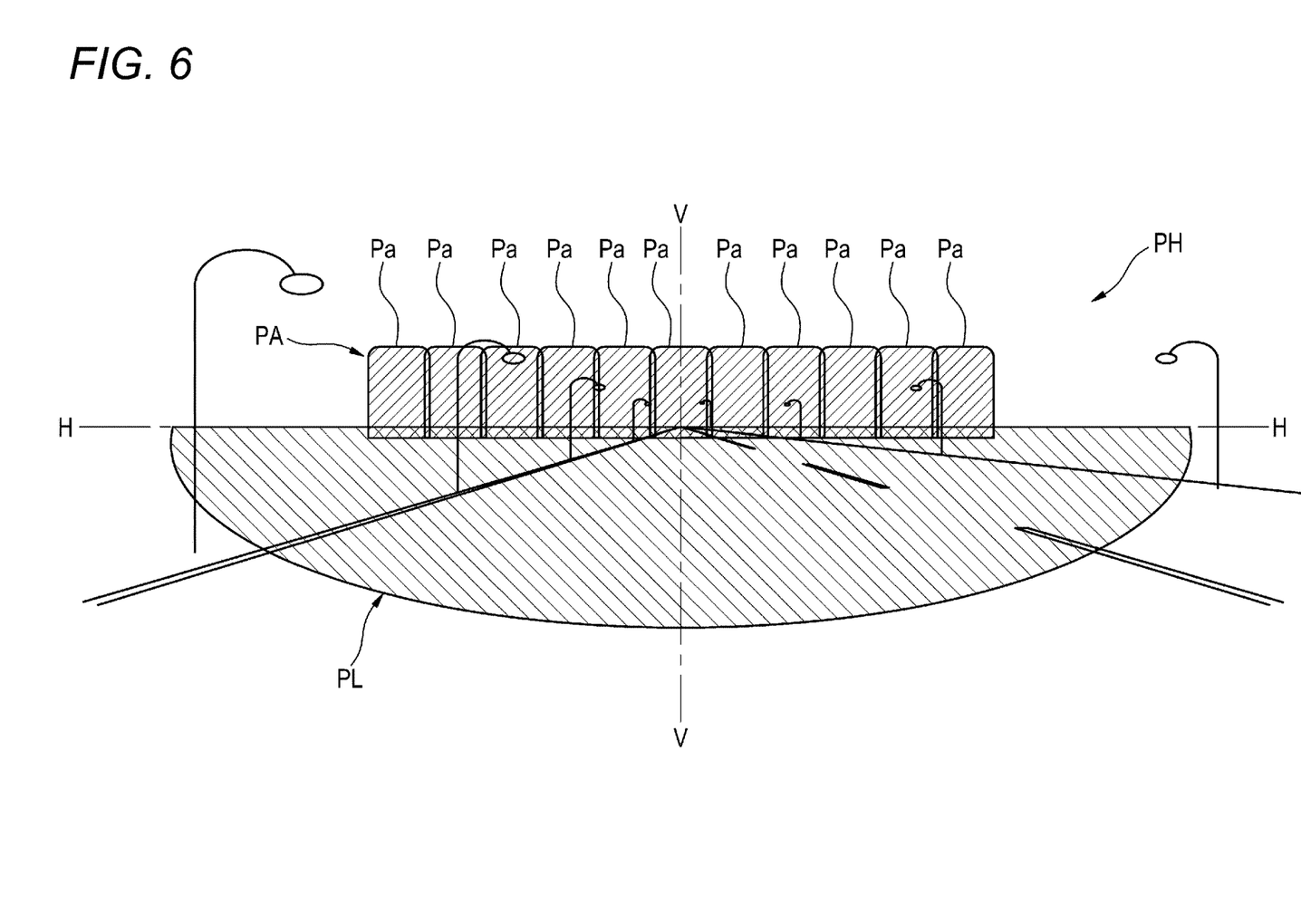
FIG. 6 is a diagram showing an example of a light distribution pattern formed by the light source unit.

FIG. 6 is a diagram showing a high beam light distribution pattern PH formed by the light source unit 2. The high beam light distribution pattern PH is formed as a combined light distribution pattern of a low beam light distribution pattern PL and an additional light distribution pattern PA. FIG. 6 shows the high beam light distribution pattern PH formed on a virtual vertical screen disposed at a position 25 m in front of the vehicle by light emitted from the light source unit 2 toward a front side.

The reflecting surface 32a of the reflector 32 and the reflecting surface 33a of the shade 33 reflect light from the light emitting element 31, thereby projecting a light source image formed on the rear focal plane of the projection lens 22 onto the virtual vertical screen as an inverted projection image by the projection lens 22, such that the low beam light distribution pattern PL is formed.

The additional light distribution pattern PA is formed as a combined light distribution pattern of eleven partial light distribution patterns Pa. Each of the partial light distribution patterns Pa is a light distribution pattern formed as an inverted projection image of a light source image of the light emitting element 34 formed on the rear focal plane of the projection lens 22 by light emitted from the light emitting element 34. In the high beam light distribution pattern PH, the additional light distribution pattern PA is additionally formed as a horizontally long light distribution pattern in a manner of being spread above the low beam light distribution pattern PL.

Figure 7:
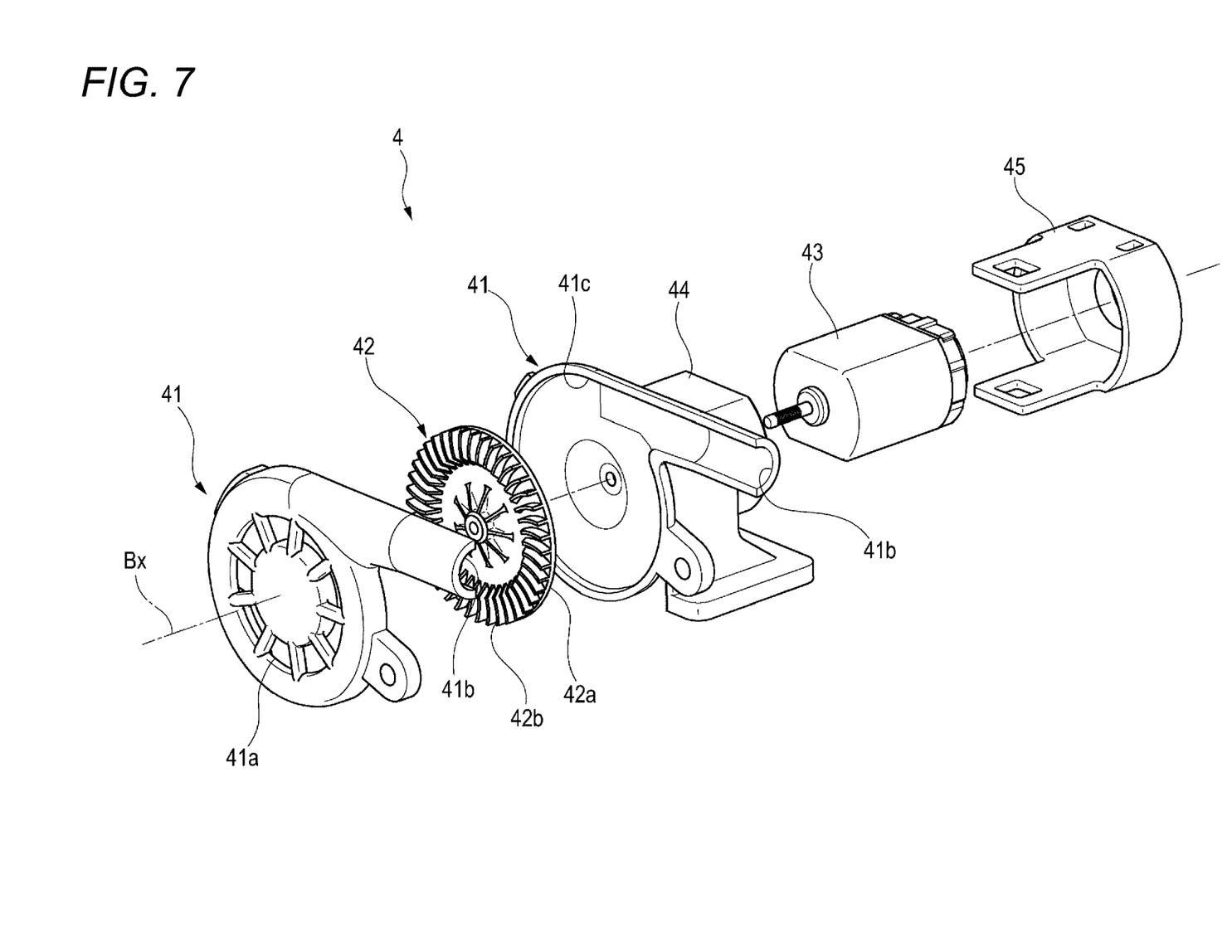
FIG. 7 is an exploded perspective view showing an air blower serving as an example of a cleaner.

FIG. 7 is an exploded perspective view showing an air blower serving as an example of the cleaner 4. As shown in FIG. 7, the cleaner 4 includes a cleaner housing 41, an impeller 42, a motor 43, a frame 44, and a motor case 45.

The impeller 42 can be rotated about a rotation axis Bx by the motor 43. The impeller 42 includes a disk-shaped plate 42a and a plurality of blades 42b. Each of the plurality of blades 42b is provided in a manner of extending in a radial direction of the impeller 42, and is disposed in a manner of forming an annular shape on the plate 42a.

The cleaner housing 41 covers the impeller 42. The cleaner housing 41 is divided into one side and the other side by the rotation axis Bx of the impeller 42. The cleaner housing 41 has a substantially doughnut-shaped internal space. The impeller 42 is housed in the internal space. The cleaner housing 41 has a suction port 41*a* for suctioning air and a blowout port 41*b* for blowing out the suctioned air. The suction port 41*a* is opened in a direction of the rotation axis Bx at a position corresponding to the plurality of blades 42*b* of the impeller 42. The blowout port 41*b* is opened in a direction intersecting the rotation axis Bx of the impeller 42.

When the impeller 42 is rotated, the air suctioned from the suction port 41*a* is pressed against an inner circumferential surface 41*c* of the cleaner housing 41 by the blades 42*b*. The air pressed against the inner circumferential surface 41*c* is guided along the inner circumferential surface 41*c* of the cleaner housing 41 and is guided to the blowout port 41*b*. The air guided to the blowout port 41*b* is sent out from the blowout port 41*b* to the outside of the cleaner 4. That is, the air suctioned in from the direction of the rotation axis Bx of the impeller 42 is pushed out in the radial direction by the blades 42*b* in rotation, is pressed against the inner circumferential surface 41*c* of the cleaner housing 41, and is sent out to the outside of the cleaner 4 from the blowout port 41*b* opened in the radial direction. The air sent from the blowout port 41*b* to the outside is blown toward the sensor region 12*a* of the transmissive cover 12 via the nozzle 4*a* (see FIG. 3) attached to the blowout port 41*b*. When the impeller 42 having the plurality of blades 42*b* is rotated, air (wind) is continuously blown toward the sensor region 12*a* of the transmissive cover 12. The air blown to the sensor region 12*a* of the transmissive cover 12 flows along the sensor region 12*a*. Dust coming close to the sensor region 12*a* is carried away to a region other than the sensor region 12*a* together with the airflow flowing along the sensor region 12*a*, and does not adhere to the sensor region 12*a*. In this manner, the cleaner 4 prevents dust or the like from adhering to at least the sensor region 12*a*.

In addition to the example described above, a propeller fan, a sirocco fan, a turbo fan, a mixed flow fan, or the like may be adopted as an air blowing mechanism of the cleaner 4. These non-positive displacement blowing devices can easily obtain a relatively large air volume. An air blowing mechanism of the air cleaner 4 may adopt a positive displacement fan of a reciprocating type, a screw type, a roots type, a vane type, or the like. Alternatively, the cleaner 4 may be provided with a piston type high-pressure air generation unit, and may be configured to intermittently eject air.

Operation Example 1

Next, an operation example of the head lamp 1 in the motorcycle 100 will be described.

For example, in a case where the vehicle body of the motorcycle 100 is in a straight traveling state, that is, in a case where the motorcycle 100 travels in a state in which the vehicle body is perpendicular to the road surface, the operation of the head lamp 1 is as follows.

The lamp controller 5 of the head lamp 1 analyzes captured image data acquired by a camera mounted as the external sensor 3, and determines whether there is an oncoming vehicle or the like whose head lamp is turned on. The lamp controller 5 detects two light spots present at a predetermined interval in the horizontal direction, thereby recognizing the light spots as head lamps of an oncoming vehicle. When such an oncoming vehicle is present, the lamp controller 5 specifies a position of the oncoming vehicle based on positions of the head lamps obtained by the analysis. The lamp controller 5 determines whether the specified oncoming vehicle is present in any one of the partial light distribution patterns Pa of the additional light distribution pattern PA shown in FIG. 6 based on the specified position of the oncoming vehicle. When an oncoming vehicle is present in one of the partial light distribution patterns Pa, the lamp controller 5 turns off the light emitting elements 34 that form the partial light distribution patterns Pa. Instead of turning off the light emitting elements 34, the lamp controller 5 may control turning-on of the light emitting elements 34 such that a luminous intensity of radiation light for forming the partial light distribution pattern Pa for which it is determined that the oncoming vehicle is present is lower than a luminous intensity when it is determined that the oncoming vehicle is not present. In this manner, the lamp controller 5 can achieve a so-called adaptive driving beam (ADB) light distribution control in which the visibility of a front region of the motorcycle 100 is improved by forming the additional light distribution pattern PA in a region other than the region in which another vehicle is present while preventing dazzling caused by the another vehicle by setting the region in which another vehicle such as an oncoming vehicle or a preceding vehicle is present as a non-radiation area.

Next, in a case where the motorcycle 100 is in a cornering state, for example, in a case where the motorcycle 100 is traveling in a state in which the vehicle body is tilted by a predetermined angle θ relative to the road surface, the operation of the head lamp 1 is as follows.

When the vehicle body is tilted, a horizontal and vertical coordinate system (referred to as an X1-Y1 coordinate system) of the motorcycle is tilted by an angle θ relative to a horizontal and vertical coordinate system (referred to as an X0-Y0 coordinate system) of the road. Therefore, since the captured image acquired by the external sensor 3 is also an image tilted by the angle θ relative to the X0-Y0 coordinate system of the road, light spots of head lamps of an oncoming vehicle to be captured are detected as two light spots present at a predetermined interval in an oblique direction. Therefore, the lamp controller 5 cannot detect the head lamps of the oncoming vehicle when the head lamps are turned on as two light spots present at a predetermined interval in the horizontal direction. Therefore, the lamp controller 5 corrects a captured image of the X1-Y1 coordinate system of the motorcycle acquired by the external sensor 3 to be a captured image that matches the X0-Y0 coordinate system of the road in accordance with the tilting angle θ of the vehicle body acquired by the bank angle sensor 7. The lamp controller 5 determines whether two light spots are present at a predetermined interval in the horizontal direction based on the corrected captured image. When two light spots present at a predetermined interval in the horizontal direction are detected, the lamp controller 5 specifies a position of the oncoming vehicle based on positions of head lamps recognized from the light spots. The lamp controller 5 adjusts the additional light distribution pattern PA formed by the light emitted from the light source unit 2 in the same manner as in the case where the vehicle body of the motorcycle 100 is in the straight traveling state.

Operation Example 2

Next, another operation example of the head lamp 1 will be described.

First, the lamp controller 5 acquires position information of an oncoming vehicle or a preceding vehicle detected by the external sensor 3, and executes a mode (hereinafter, referred to as an ADB mode) of adjusting the additional light distribution pattern PA based on the position information. That is, in a case where an oncoming vehicle or the like is present, the lamp controller 5 turns off or dims the light emitting element 34 for forming the partial light distribution pattern Pa in which it is determined that the oncoming vehicle is present. During the execution of the ADB mode, air is blown from the nozzle 4a of the cleaner 4 to the sensor region 12a of the transmissive cover 12.

Next, the lamp controller 5 determines whether dirt adheres to the sensor region 12a. When it is determined that dirt adheres to the sensor region 12a, that is, when it is determined that dirt adhered to the sensor region 12a is not removed even in a state in which air is blown from the nozzle 4a toward the sensor region 12a of the transmissive cover 12, the lamp controller 5 stops the ADB mode and notifies an occupant of the motorcycle 100 that the ADB mode is stopped. As a method for notifying the occupant that the ADB mode is stopped, for example, a warning may be displayed on an instrument unit of the motorcycle 100 or a warning sound may be output.

Although air is constantly blown from the nozzle 4a of the cleaner 4 toward the sensor region 12a of the transmissive cover 12 during the execution of the ADB mode in the operation example 2, the lamp controller 5 may blow air from the cleaner 4 toward the sensor region 12a only when it is determined that dirt adheres to the sensor region 12a. Thereafter, the lamp controller 5 may determine again whether dirt adheres to the sensor region 12a. In a case where it is determined that dirt adhered to the sensor region 12a is not removed even when air is blown, the lamp controller 5 may stop the ADB mode and notify the occupant of the motorcycle 100 that the ADB mode is stopped.

Alternatively, the lamp controller 5 may determine whether dirt adheres to the sensor region 12a of the transmissive cover 12. When it is determined that dirt adheres to the sensor region 12a, the lamp controller 5 may stop the ADB mode regardless of whether air is blown from the cleaner 4, and may warn the occupant that the ADB mode is stopped because dirt adheres to the sensor region 12a.

Although a case in which the lamp controller 5 executes a processing of analyzing the image data acquired by the external sensor 3 or the like has been described in the operation examples described above, the present invention is not limited thereto. For example, the processing may be not be executed by the lamp controller 5 but executed by the image processor 6.

As a lamp for a four-wheeled vehicle such as an automobile, there is a known a lamp in which LiDAR or a camera is housed in a lamp chamber of a head lamp. In such a sensor-housed lamp for a four-wheeled vehicle, it is less necessary to consider a reduction in detection accuracy of a sensor due to banking of a vehicle body. On the other hand, for a sensor mounted on a vehicle such as the motorcycle 100 that travels at a corner by tilting a vehicle body, a problem such as a reduction in detection accuracy of a sensor due to banking of the vehicle body is likely to occur.

Therefore, as described above, the head lamp 1 according to the present embodiment includes the light source unit 2, the external sensor 3 that detects information on the outside of the motorcycle 100, and the housing 10 that houses the light source unit 2 and the external sensor 3. The head lamp 1 is disposed at the central portion in the left-right direction of the vehicle body of the motorcycle 100, and the external sensor 3 is disposed in the housing 10 at the central portion in the left-right direction of the head lamp 1. According to this configuration, the external sensor 3 housed in the head lamp 1 mounted on the motorcycle 100 that travels at a corner by tilting the vehicle body is mounted in the vicinity of the central portion in the left-right direction of the vehicle body. Therefore, external information (surrounding environment) of the motorcycle 100 can be accurately detected by the external sensor 3, and the detection accuracy of the external sensor 3 is less likely to be reduced even when the vehicle body is tilted as compared with a case where the external sensor is provided at least at one end of the vehicle body in the left-right direction. As described above, according to the present embodiment, an efficient layout of the external sensor 3 in the head lamp 1 can be made, and the detection accuracy of the external sensor 3 housed in the head lamp 1 mounted on the motorcycle 100 can be maintained.

In the present embodiment, the light source unit 2 is implemented by a single light source unit, and the external sensor 3 is arranged in parallel with the light source unit 2 in the upper-lower direction of the head lamp 1. According to this configuration, since the external sensor 3 built in the single-lamp head lamp 1 is disposed directly above or directly below the light source unit 2, the optical axis Ax of the light source unit 2 and the optical axis of the external sensor 3 can be aligned with each other. Therefore, an adjustment of a posture of the light source unit 2 and an adjustment of a detection reference of the external sensor 3 can be collectively performed. In addition, the lamp controller 5 can accurately and easily execute a control when a light distribution pattern of the light source unit 2 is adjusted based on the external information detected by the external sensor 3.

The head lamp 1 according to the present embodiment further includes the cleaner 4 having at least one nozzle 4a capable of blowing air to clean at least the sensor region 12a corresponding to the external sensor 3 on the transmissive cover 12 attached to the housing 10. According to this configuration, it is possible to maintain the detection accuracy of the external sensor 3 by preventing dirt from adhering to the sensor region 12a that is a surface to be cleaned by the external sensor 3 or removing dirt adhered to the sensor region 12a. In addition, since the cleaner 4 is implemented by an air blower capable of continuously blowing air, it is possible to continuously prevent dirt from adhering to the sensor region 12a.

In the present embodiment, the lamp controller 5 is configured to correct a captured image acquired by a camera serving as the external sensor 3 according to a tilting state of the vehicle body, detect an object outside the motorcycle 100 based on the corrected captured image, and adjust a light distribution pattern formed by light emitted from the light source unit 2 according to a position of the detected object. According to this configuration, even when the motorcycle 100 is traveling with the vehicle body being tilted, an object such as an oncoming vehicle can be detected with high accuracy, and a light distribution pattern corresponding to the object can be appropriately formed.

An in-vehicle sensor (for example, an in-vehicle camera) that is mounted on a four-wheeled vehicle such as an automobile and monitors a front side of the vehicle is often mounted in a vehicle cabin between a windshield and an inner mirror mounting portion. When dirt, dew condensation, snow, or the like adheres to the windshield in front of the in-vehicle sensor, dirt, dew condensation, snow, or the like can be removed by a wiper, a window washer, a defroster, or the like. On the other hand, in the case of a motorcycle, it is structurally or economically difficult to adopt a cleaning mechanism such as a wiper or a window washer mounted on a four-wheeled vehicle.

Therefore, in the head lamp 1 mounted on the motorcycle 100 according to the present embodiment, the lamp controller 5 is configured to stop the ADB mode and notify an occupant of the motorcycle 100 that the ADB mode is stopped when it is determined that dirt adhered to the transmissive cover 12 is not removed by the air blown from the cleaner 4 during the execution of the light distribution control in the ADB mode. According to this configuration, by stopping the ADB mode in a situation in which it is predicted that the detection accuracy of the external sensor 3 is reduced, it is possible to prevent a careless light distribution control in a situation in which the surrounding environment cannot be appropriately detected. In particular, as described above, in the case of the motorcycle 100, since it is difficult to provide a mechanical cleaning mechanism such as a wiper, it is practical to notify the occupant that the ADB mode is stopped because dirt adheres to the sensor region 12a, and for example, the dirt adhered to the transmissive cover 12 is removed by a hand of the occupant and the ADB mode is restored. Accordingly, it is possible to provide a system capable of restoring the ADB mode at low costs.

(Modification)

Next, a modification of the head lamp will be described with reference to FIG. 8. The head lamp 1 according to the embodiment described above includes the single light source unit 2, and the external sensor 3 is arranged in parallel with the single light source unit 2 in the upper-lower direction of the lamp. The present invention is not limited thereto. For example, the head lamp may include a plurality of light source units.

Figure 8:
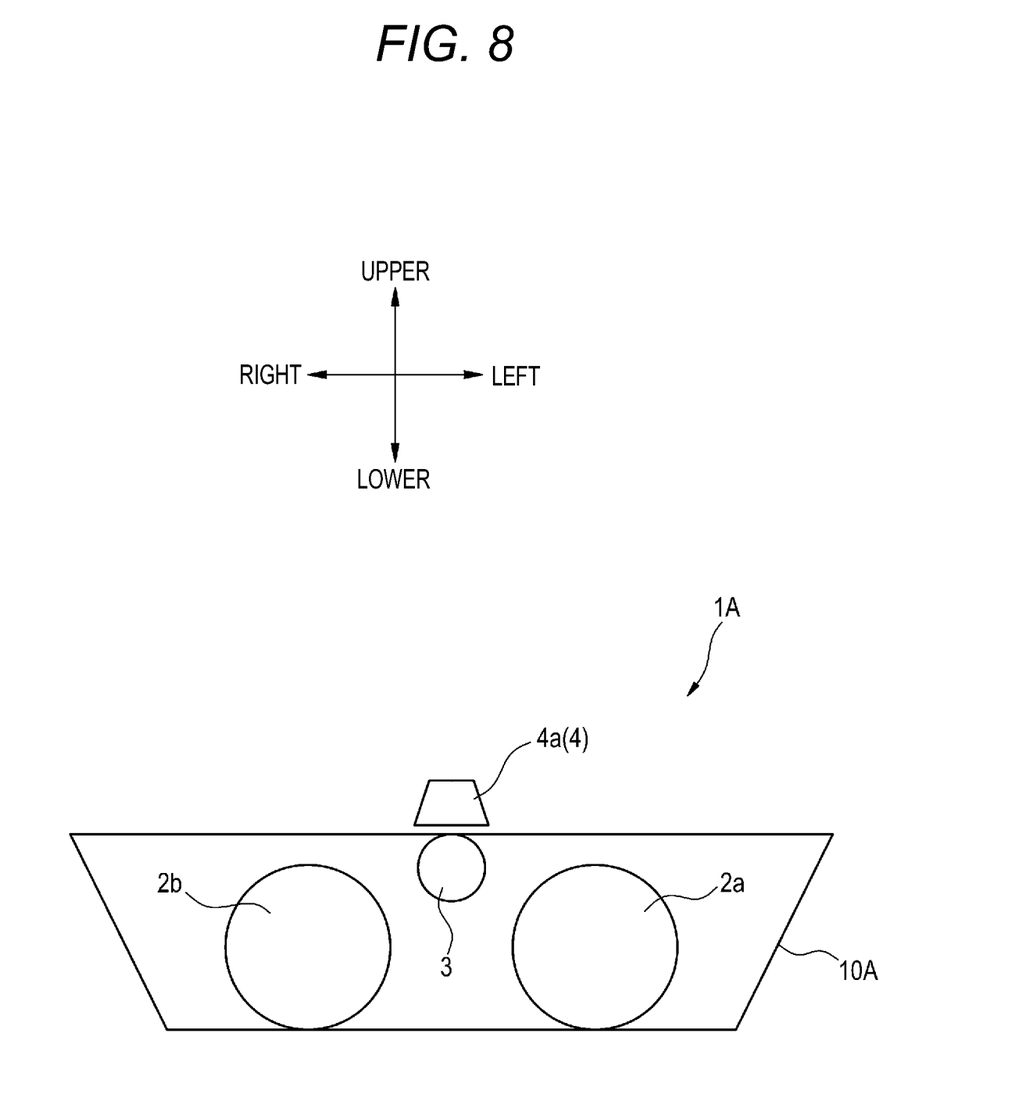
FIG. 8 is a front view schematically showing a configuration of a head lamp according to a modification.

FIG. 8 is a front view showing a configuration of a head lamp 1A according to the modification. As shown in FIG. 8, the head lamp 1A includes, for example, a pair of light source units 2a and 2b. The pair of light source units 2a and 2b are arranged in parallel in the left-right direction of the head lamp 1A in a housing 10A of the head lamp 1A. The pair of light source units 2a and 2b are arranged symmetrically relative to the center of the head lamp 1A in the left-right direction. The external sensor 3 is disposed in the housing 10 at a central portion of the head lamp 1A in the left-right direction. The cleaner 4 is disposed outside the housing 10A at a central portion of the head lamp 1 in the left-right direction.

The external sensor 3 is disposed at a position at equal distances from the pair of light source units 2a and 2b. In the present example, the external sensor 3 is disposed at an upper right side of the light source unit 2a and at an upper left side of the light source unit 2b. The cleaner 4 is disposed in parallel with the external sensor 3 in the upper-lower direction of the head lamp 1A. In the present example, the cleaner 4 is disposed directly above the external sensor 3.

In the head lamp 1A according to the present modification, since the external sensor 3 is disposed at equal distances from the light source units 2a and 2b, light emitted from the light source units 2a and 2b can be efficiently used, and external information can be accurately acquired. Therefore, according to the above configuration, it is possible to efficiently lay out the external sensor 3 in a two-lamp type lamp.

Although embodiments of the present invention have been described above, it is needless to say that the technical scope of the present invention should not be interpreted as being limited to the description of the embodiments. It is to be understood by those skilled in the art that the present embodiment is merely an example and various modifications may be made within the scope of the invention described in the claims. The technical scope of the present invention should be determined based on the scope of the inventions described in the claims and a scope of equivalents thereof.

The present application is based on Japanese Patent Application NO. 2020-5232 filed on Jan. 16, 2020, and the contents of which are incorporated herein by reference.

The invention claimed is:

1. A vehicle lamp provided in a vehicle that travels at a corner by tilting a vehicle body, the vehicle lamp comprising:
   a light source unit including an opening on a front side of the vehicle;
   a sensor configured to detect information on outside of the vehicle;
   a housing including a lamp body that houses the light source unit and the sensor; and
   a lamp controller configured to control the sensor,
   wherein the vehicle lamp is disposed at a central portion of the vehicle body in a left-right direction,
   wherein the sensor is disposed in the housing at a central portion in the left-right direction,
   wherein the lamp body includes:
     a body portion including the opening; and
     a body attachment and detachment portion that is detachably attached to a lower portion of the body portion, and
   wherein the lamp controller is housed in the body attachment and detachment portion.

2. The vehicle lamp according to claim 1,
   wherein the light source unit is implemented by a single light source unit, and
   wherein the sensor is arranged in parallel with the single light source unit in an upper-lower direction.

3. The vehicle lamp according to claim 1,
   wherein the light source unit is implemented as a pair of light source units arranged in parallel in the left-right direction, and
   wherein the sensor is disposed at an equal distance from each of the pair of light source units.

4. The vehicle lamp according to claim 1, further comprising:
   a transmissive cover attached to the housing; and
   a cleaner having at least one nozzle configured to clean at least a region corresponding to the sensor in the transmissive cover using a cleaning medium.

5. The vehicle lamp according to claim 4,
   wherein the cleaner is an air blower configured to continuously blow air.

6. The vehicle lamp according to claim 4, further comprising:
   a controller configured to control the sensor,
   wherein the controller is configured to execute a mode of adjusting a light distribution pattern formed by light emitted from the light source unit in accordance with a position of an object that is located outside the vehicle and is detected by the sensor, and
   upon determining that dirt adhered to the transmissive cover is not removed by the cleaning medium during the execution of the mode, the controller stops the mode and notifies an occupant of the vehicle that the mode is stopped.

7. The vehicle lamp according to claim 1, further comprising:

a controller configured to control the sensor, wherein the sensor is a camera configured to acquire a captured image of the outside of the vehicle, and wherein the controller is configured to correct the captured image acquired by the camera in accordance with a tilting state of the vehicle body, and adjust a light distribution pattern formed by light emitted from the light source unit in accordance with a position of an object that is located outside the vehicle and is detected based on the corrected captured image.

* * * * *